Sept. 14, 1954     O. A. ALBIN     2,689,050
DISPLAY DEVICE
Filed June 28, 1951     2 Sheets-Sheet 1
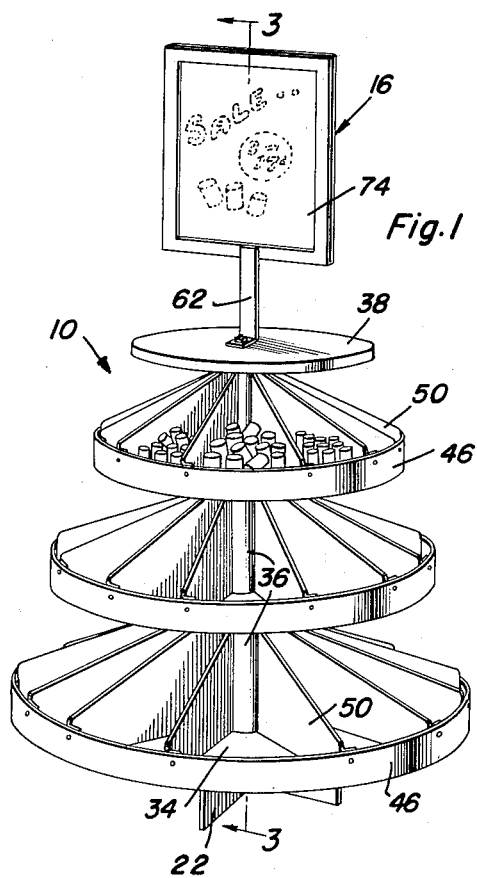
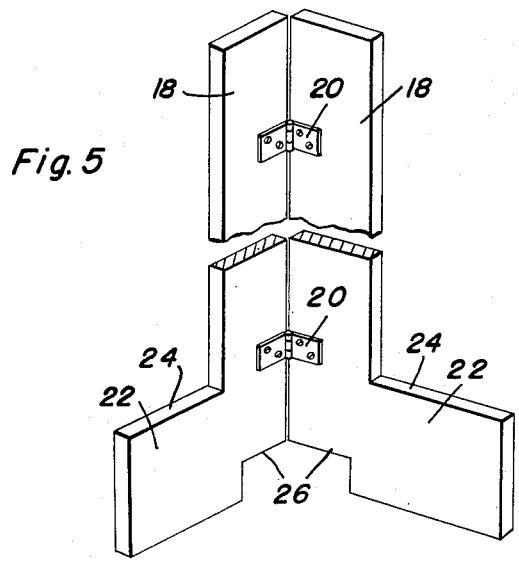
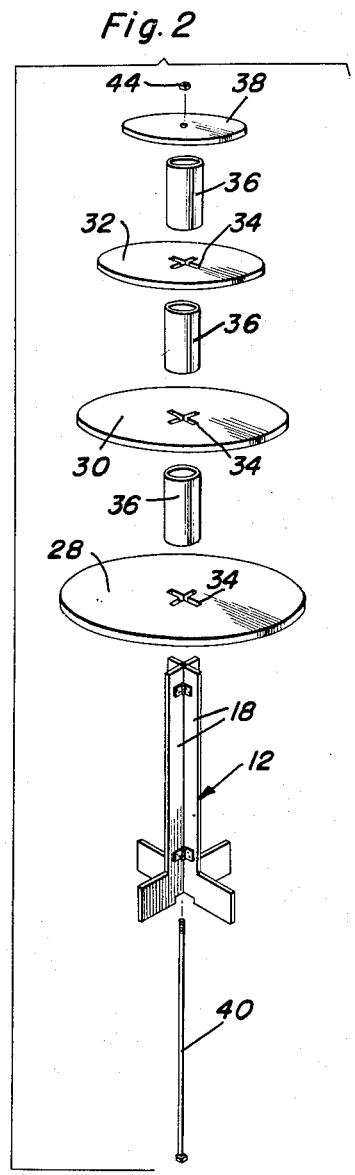
Orval A. Albin
*INVENTOR.*

Sept. 14, 1954
O. A. ALBIN
2,689,050
DISPLAY DEVICE
Filed June 28, 1951
2 Sheets-Sheet 2
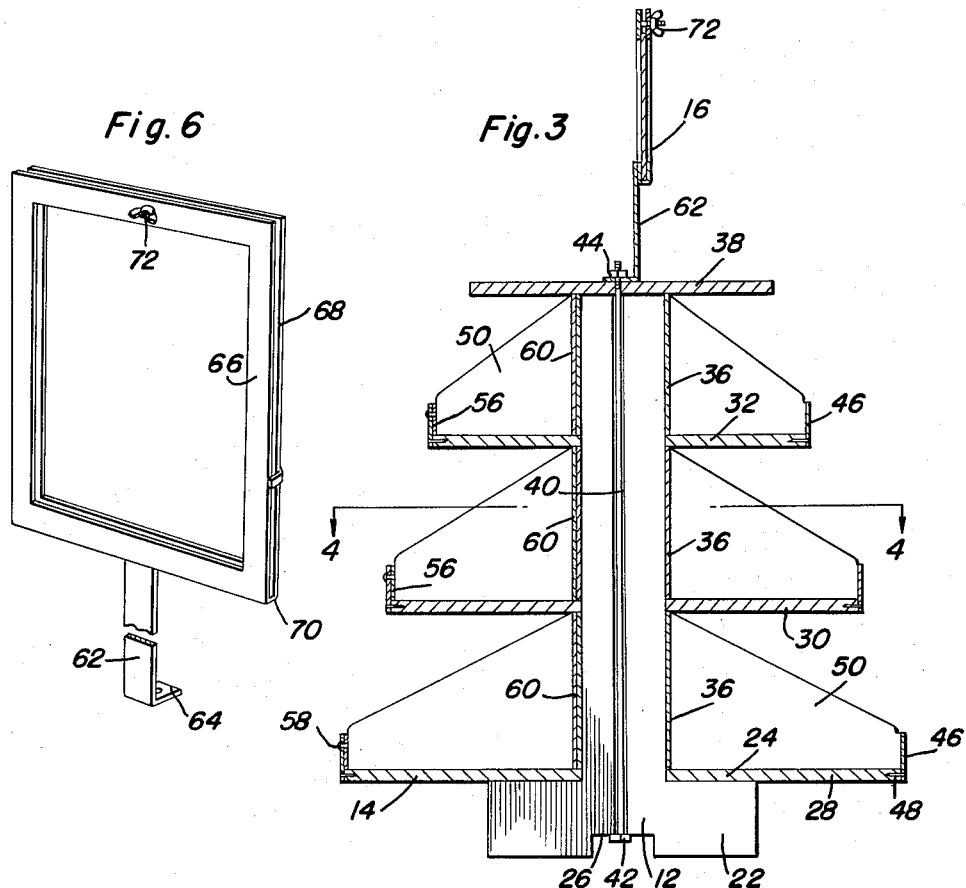
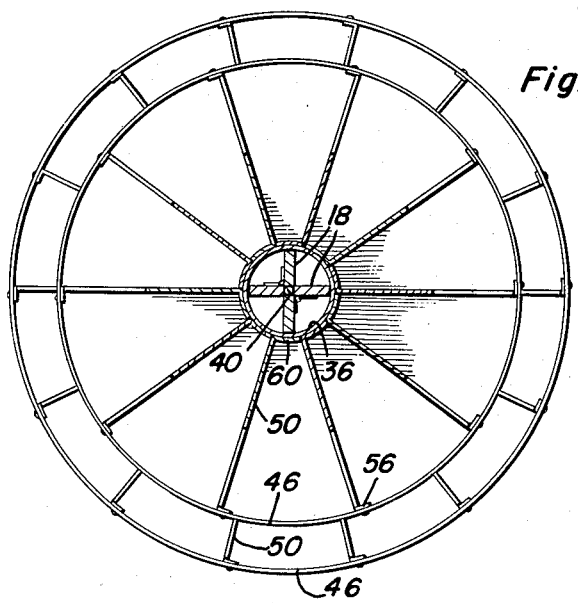
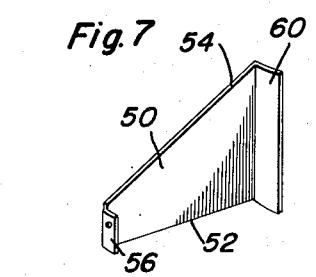
Orval A. Albin
INVENTOR.

Patented Sept. 14, 1954

2,689,050

UNITED STATES PATENT OFFICE 2,689,050

DISPLAY DEVICE

Orval A. Albin, Tulsa, Okla., assignor of one-half to Willis R. Oakley

Application June 28, 1951, Serial No. 234,003

2 Claims. (Cl. 211—128)

This invention comprises novel and useful improvements in a display device and more specifically pertains to a display stand having vertically stacked display trays together with an improved structure for assembling the trays and stand into a detachable, collapsible but unitary assembly.

The principal object of this invention is to provide an improved display stand having vertically stacked trays therein together with improved means for maintaining the trays in a sturdy assembly upon the stand.

A further object of the invention is to provide a display device in conformity with the preceding object which shall be capable of construction from inexpensive and lightweight materials, be readily collapsed into a small space for storage or transportation, and can be easily assembled and erected into a display stand having a large capacity.

Yet another object of the invention is to provide an improved display stand in accordance with the preceding objects and wherein the tray structure cooperates with the stand for reinforcing and rigidly connecting the members of the latter.

A still further object of the invention is to provide an apparatus as set forth in the above mentioned objects wherein each of the trays may be divided into a plurality of compartments in an improved manner.

A still further object of the invention is to provide a sectional display stand as set forth in the above mentioned objects in which spacer members for vertically spacing the series of trays are also utilized as a part of the walls of the trays.

And a final important object of the invention specifically enumerated herein, is to provide an improved display stand having a single fastening means for securing the various elements in assembled position and in which this fastening means is utilized to support a sign holder.

The foregoing, together with the various ancillary features and objects of the invention which will later become apparent as the following description proceeds, are attained by the present invention, a preferred embodiment of which has been illustrated, by way of example only, in the accompanying drawings, wherein:

Figure 1 is a perspective view showing one suitable embodiment of a display stand incorporating therein the princples of this invention;

Figure 2 is an exploded perspective view of certain elements of the display stand assembly;

Figure 3 is a vertical central sectional view taken substantially upon the plane indicated by the section line 3—3 of Figure 1 and showing the internal structure of the assembly;

Figure 4 is a horizontal section view taken substantially upon the plane indicated by the section line 4—4 of Figure 3 and showing further structual details of the assembly;

Figure 5 is a perspective view, parts being broken away, of one of the two members forming the supporting standard of the device;

Figure 6 is a perspective view, part being broken away, of a sign holder forming a part of this invention; and, Figure 7 is a perspective view of a divider plate for partitioning the interior of the trays into separate compartments.

Referring now specifically to the accompanying drawings, wherein like numerals designate similar parts throughout the various views, it will be seen that the display stand in accordance with this invention is indicated generally by the numeral 10 and as shown in Figure 3 includes a vertical standard 12 having a plurality of trays 14 thereon which may be of different sizes as desired, and which are vertically spaced upon the standard, together with a sign holder 16. The sign holder, trays and standard are retained in assembled position, or secured against relative movement and are structurally braced and reinforced as set forth hereinafter.

Referring first to Figures 2, 3 and 5, it will be seen that the standard 12 consists of a pair of identical members, one of which is illustrated in Figure 5, comprising a pair of vertically extending plate-like sections 18. These sections have adjacent vertical edges hinged to each other as at 20 for horizontal swinging movement about a vertical axis. This vertical axis, as will be apparent hereinafter, constitutes the central axis of the standard.

The sections 18 of the members of the standard may be constructed of any suitable material, and in any desired dimension. Preferably however, the vertical edges are parallel to each other, while at their lower end they are provided with laterally extending legs 22 having horizontal upper surfaces and adjacent their hinged extremities, having their lower surfaces cut away or vertically recessed as at 26.

By virtue of their hinged connections, the sections 18 of each of these members may thus be compactly folded or collapsed to permit convenient transportation and storage of the same. However, in normal use they are disposed with the sections 18 normal or perpendicular to each other as shown in Figures 2 and 5, and the two members are disposed in back to back relationship as shown in Figure 2 so that the four sections 18 are disposed in two pairs of opposite sections, the pairs being disposed perpendicular to each other to provide a standard of non-circular, cruciform shaped cross-section.

It will be readily appreciated however, that the angular relationship between the sections 18 need not be in the form of a cross, but could be any other suitable angular inclination desired.

It is evident that the trays 14 can be of any desired size, can be all the same size if desired, although as illustrated it is considered preferable in the interests of efficiency of display, to form the successively higher trays of a smaller diameter. In any event, each of these trays includes a flat plate 28, 30 and 32 which as shown may conveniently be of a circular shape. In the central portion, each of these plates is provided with cross-shaped slots 34 of identical size and arrangement, which slots slidably receive the vertical sections 18. By this means, the trays are slidably but non-rotatably secured to the standard, and constitute an efficient means for rigidly securing the four sections of the two members of the standard in the desired angular relationship to provide a rigid base assembly.

A plurality of cylindrical spacer sleeves 36 are provided which slidably embrace the vertical edges of the sections 18, these spacer sleeves being interposed between adjacent bases for vertically positioning the trays at the desired vertical disposition. Preferably the spacer members are adapted to snugly embrace the edges of the sections 18, as will be clearly apparent from Figure 3.

The topmost of the spacer sleeves is disposed on the upper base plate 32 and supports upon its upper end a cap or top plate 38 which may comprise a platform for supporting various articles for display by this stand.

With the trays, tray bases and sleeves threaded upon the standard as shown in Figure 3, and the cap or cover 38 in place, a tie rod 40 is disposed between four hinged edges of the sections, with its head 42 positioned in previously mentioned recess 26, and with its upper end provided with a fastening nut 44 by means of which the cover plate is retained upon the standard and the entire device is secured in assembled position.

It may be here noted that, as shown in Figure 5, the adjacent vertical edges of the sections 18 are hinged to each other in such a manner as to provide a chamber or passage of square cross-section when the four sections are assembled. The tie rod 40 extends through this passageway as previously mentioned.

Each of the trays includes a rim 46 secured to its base plate by suitable fasteners 48 whereby each tray is adapted to receive various articles or merchandise for artistic and effective display purposes.

While the trays may be employed without the use of dividers to form compartments, it is preferred to utilize the partition construction disclosed in these drawings. For that purpose, a plurality of divider plates or partitions 50 are utilized, the structure of each plate being clearly apparent from Figure 7. Each plate is of a substantially triangular shape having a horizontal bottom edge 52 adapted to rest upon the upper surface of the corresponding tray base plate and having an inclined upper surface 54. At its radially outer end, the plate 50 has an inturned flange 56 which is riveted or otherwise secured as at 58 to the inner surface of the rim 48, while the radially inner end of the plate is provided with an arcuately shaped flange 60, which as shown in Figure 4 is adapted to snugly embrace and rest against the exterior surface of the cylindrical spacers 36. However, the flange 60 is not fastened to the spacers but merely abuts the same to facilitate the assembly and disassembly of the device.

The upper edge of the flange 60 and of the inclined upper edge 54 of the spacer plate 50 terminates in the same horizontal plane as the upper edge of the adjacent spacer sleeve 36, and in conjunction with that sleeve serves to support the immediately superimposed tray base plate or the cover 38.

The sign holder 60 may conveniently comprise a supporting bracket 62 having an inturned apertured flange 64 at its lower end which is secured upon the tie rod 40 by the nut 44 as illustrated. Secured to the upper end of the bracket 62 in any desired manner, is a rectangular frame comprising a pair of parallel sections 66 and 68 which should be integrally connected at their lower end as by the way of 70, see Figure 6, and which are open at their upper end. A wing bolt or the like 72 may be provided for these frames for tightening them against each other and upon a sign 74 disposed therebetween as shown in Figure 1.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A display device comprising a supporting standard of non-circular cross-section, a plurality of trays slidably but non-rotatably received on said standards, spacing sleeves surrounding said standard and interposed between adjacent trays, a top on said standard abutting the uppermost of said sleeves for retaining said trays against movement on the standard, said standard comprising two members, each member having a pair of sections hingedly connected upon a vertical edge and a tie rod disposed between the adjacent vertical hinged edges of said sections and retaining said trays and sections together.

2. A display device comprising a supporting standard of non-circular cross-section, a plurality of trays slidably but non-rotatably received on said standards, spacing sleeves surrounding said standard and interposed between adjacent trays, a top on said standard abutting the uppermost of said sleeves for retaining said trays against movement on the standard, said standard comprising two members, each member having a pair of sections hingedly connected upon a vertical edge and each section having a supporting leg extending laterally from its lower portion, said leg having an upper surface supporting the lowermost tray, and a tie rod disposed between the adjacent vertical hinged edges of said sections and retaining said trays and sleeves against relative movement on the standard.

References Cited in the file of this patent

UNITED STATES PATENTS

| Number | Name | Date |
|---|---|---|
| 574,380 | Bradley | Jan. 5, 1897 |
| 922,888 | Grunwaldt | May 25, 1909 |
| 1,047,882 | Beach | Dec. 17, 1912 |
| 1,566,025 | Lazarus | Dec. 15, 1925 |
| 1,712,389 | Marchant | May 7, 1929 |
| 1,900,610 | Mullins | Mar. 7, 1933 |
| 1,934,846 | Ebert | Nov. 14, 1933 |

FOREIGN PATENTS

| Number | Country | Date |
|---|---|---|
| 144,970 | Great Britain | June 24, 1920 |